ELECTRONIC DIGITAL COMPARATOR

Filed Aug. 15, 1966 4 Sheets-Sheet 1

| X | X5 | X4 | X3 | X2 | X1 |
|---|---|---|---|---|---|
| 1 | 0 | 0 | 0 | 0 | 1 |
| 2 | 0 | 0 | 0 | 1 | 0 |
| 3 | 0 | 0 | 1 | 0 | 0 |
| 4 | 0 | 1 | 0 | 0 | 0 |
| 5 | 1 | 0 | 0 | 0 | 0 |

Inventor
Gérard Cottrez
By Cushman, Darby & Cushman
Attorneys

March 10, 1970 G. COTTREZ 3,500,321

ELECTRONIC DIGITAL COMPARATOR

Filed Aug. 15, 1966 4 Sheets-Sheet 2

Inventor
Gerard Cottrez
By Cushman, Darby & Cushman
Attorneys

| X | $X_5$ | $X_4$ | $X_3$ | $X_2$ | $X_1$ |
|---|---|---|---|---|---|
| 1 | 0 | 0 | 0 | 0 | 0 |
| 2 | 0 | 0 | 0 | 0 | 1 |
| 3 | 0 | 0 | 0 | 1 | 1 |
| 4 | 0 | 0 | 1 | 1 | 1 |
| 5 | 0 | 1 | 1 | 1 | 1 |
| 6 | 1 | 1 | 1 | 1 | 1 |
| 7 | 1 | 1 | 1 | 1 | 0 |
| 8 | 1 | 1 | 1 | 0 | 0 |
| 9 | 1 | 1 | 0 | 0 | 0 |
| 10 | 1 | 0 | 0 | 0 | 0 |

Inventor
Gerard Cottrez
By Cushman, Darby & Cushman
Attorneys

Gerard Cottrez
Inventor
By Cushman, Darby & Cushman
Attorneys

United States Patent Office 3,500,321
Patented Mar. 10, 1970

3,500,321

ELECTRONIC DIGITAL COMPARATOR

Gérard Cottrez, Rueil-Malmaison, France, assignor to La Telemecanique Electrique (Societe Anonyme), Nanterre, Hauts-de-Seine, France Filed Aug. 15, 1966, Ser. No. 572,394
Claims priority, application France, Aug. 26, 1965, 29,470
Int. Cl. G06f *7/02, 7/04*
U.S. Cl. 340—146.2 5 Claims

ABSTRACT OF THE DISCLOSURE

The invention broadly relates to electronic comparators for indicating whether one of two coded members is equal to or less than or more than the other. The instant invention provides a comparator which is directly operated by the binary signals which represent the two numbers in a special binary code, and which does not include electro-mechanically switching any relay means.

Figures 1, 2:
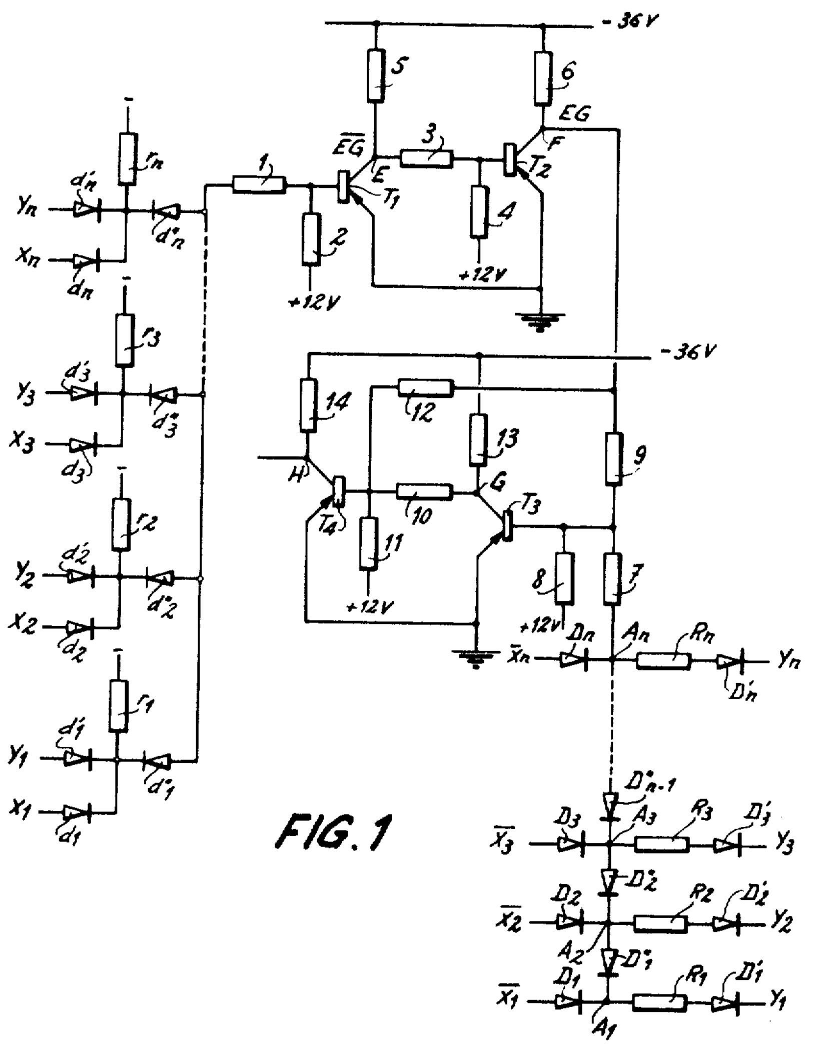

The present invention relates to a comparator and, more particularly, to a comparator which will indicate whether one of two coded numbers is equal to the other or less than or more than.

Such a device would be used, for example, in systems for altering position in which the existing position and the desired position are translated by two coded numbers, the result of comparison of these two numbers determining the order for altering position. The two coded numbers X and Y will generally be provided under the form of *n* binary electrical signals $X_1$ ,$X_2$ . . . $X_n$ and $Y_1$, $Y_2$ . . . $Y_n$ at outputs of the bistable units of binary counters wherein the two numbers are stored and the complements $\overline{X}_1$, $\overline{X}_2$ . . . $\overline{X}_n$ and $\overline{Y}_1$, $\overline{Y}_2$ . . . $\overline{Y}_n$ will also be available at other outputs of the bistable units.

It is an object of the present invention to provide a comparator which is adapted for being directly operated by such binary signals and their complements.

It is another object of the invention to provide a comparator which is adapted for being directly operated by the binary signals which represent two numbers coded in any binary code of the general type which has *n* binary positions in which *n* successive numbers, with an arbitrary base of numeration, are respectively represented by *n* binary numbers, and in which the digit "0" or "1" progresses from one binary position to the left when passing from a binary number to the next with the result that the *n* binary numbers form one or more successive square grids each of which comprises a diagonal of "0" or "1" to each side of which the grid only contains "0" or "1."

Digital comparators adapted for indicating the relative values of two numbers represented by binary electrical signals provided at the outputs of the bistable units of binary counters are already known. However, the prior art digital comparators of that type generally include, not only electronic gates built with resistors and diodes, but also electro-mechanical switching and relay means co-operating with the said gates. The said electro-mechanical means are liable to break-downs and their life duration is much lower than that of the electronic gates. It is well known that the operation of electro-mechanical means for switching circuits through which low currents flow under small voltages is not very dependable. The relays are comparatively cumbersome, slow operating and power consuming, while their cost of manufacture is comparatively high. The making and breaking of the contacts is generally accompanied with the generation of transient currents which may disturb the operation of the gates.

For all these reasons, it would be highly desirable to eliminate any conventional relay or switch from the circuits.

Therefore, it is an object of the present invention to provide a comparator which exclusively consists of electronic gates and logic circuits, yet being relatively simple in structure and providing an indication, not only of when the two compared numbers are equal or unequal, but also, of which is higher than the other.

Still another object of this invention is to provide a digital comparator structure comprising at least one group of *n* AND gates whose outputs are parallel-connected to an OR gate and have respectively applied to them, in use, the respective binary signals $Y_1$, $Y_2$ . . . $Y_n$ representing a number Y to be compared with a number X, each of the AND gates also receiving, in use, those of the binary signals $\overline{X}_1$, $\overline{X}_2$ . . . $\overline{X}_n$ representing the complement of the number X which have an index equal to or greater than that of the binary signal representing the number Y which is applied thereto.

According to a preferred embodiment, the group of AND gates and the OR gate form a double comb structure with *n* pairs of teeth, the two teeth to right and left of successive pairs of AND gates being arranged on either side of a central branch. Signals representing one of the coded numbers are applied to the free extremities of the *n* teeth to the right (or to the left) whilst the signals representing the complement of the other coded number are applied to the *n* teeth to the left (or to the right), each of the teeth on the left (or on the right) comprising a diode, or an equivalent component, capable of transmitting those of the signals of a first level of potential and blocking those of the signals which are of a second level of potential lower than the first level. Each of the teeth to the right (or to the left) comprising a resistor connected in series with a diode, or equivalent component, poled in the same sense as the diode of the tooth to the left (or right) opposite, a signal with a higher potential level than the first level being applied through resistor means to one extremity of the central branch which incorporates diodes or equivalent components capable of transmitting the potential to the teeth, the resistor means having an intermediate point which is connected to an indicating device capable of generating two distinct signals depending on the value of the potential of the said intermediate point.

Figure 3:
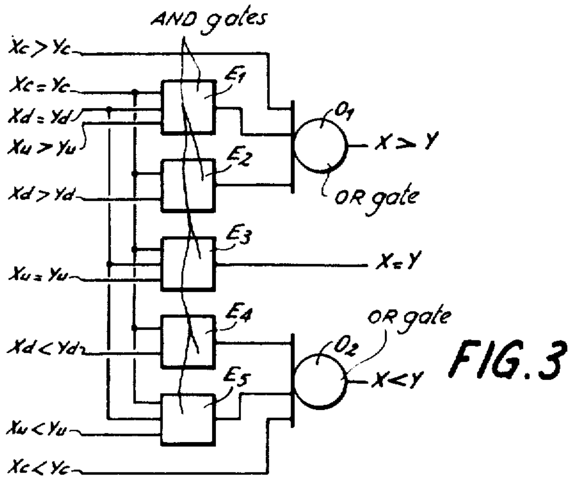
Figure 4:
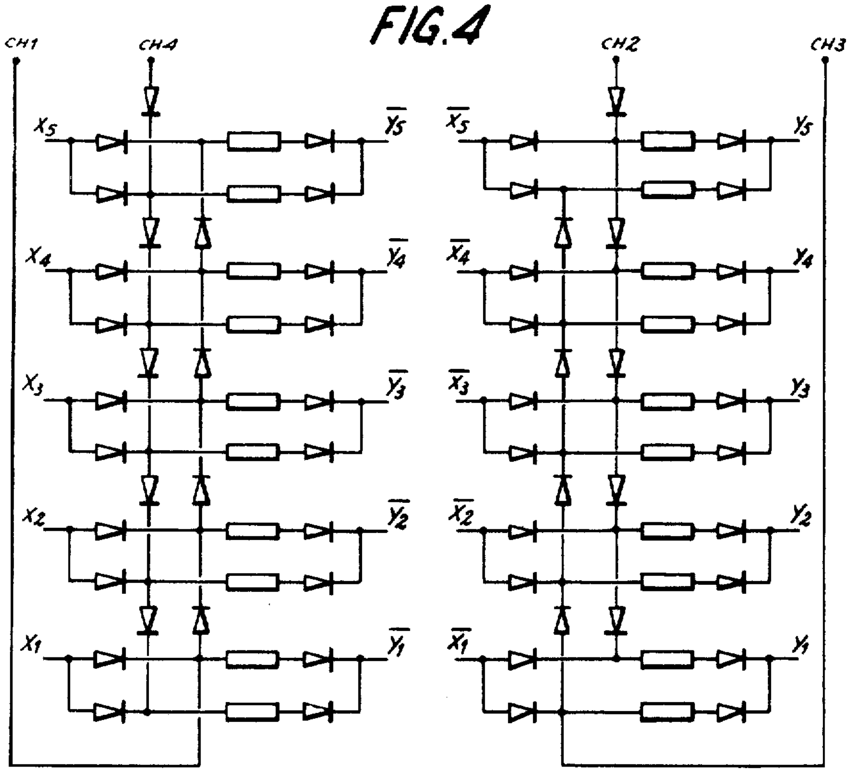
Figures 5, 6:
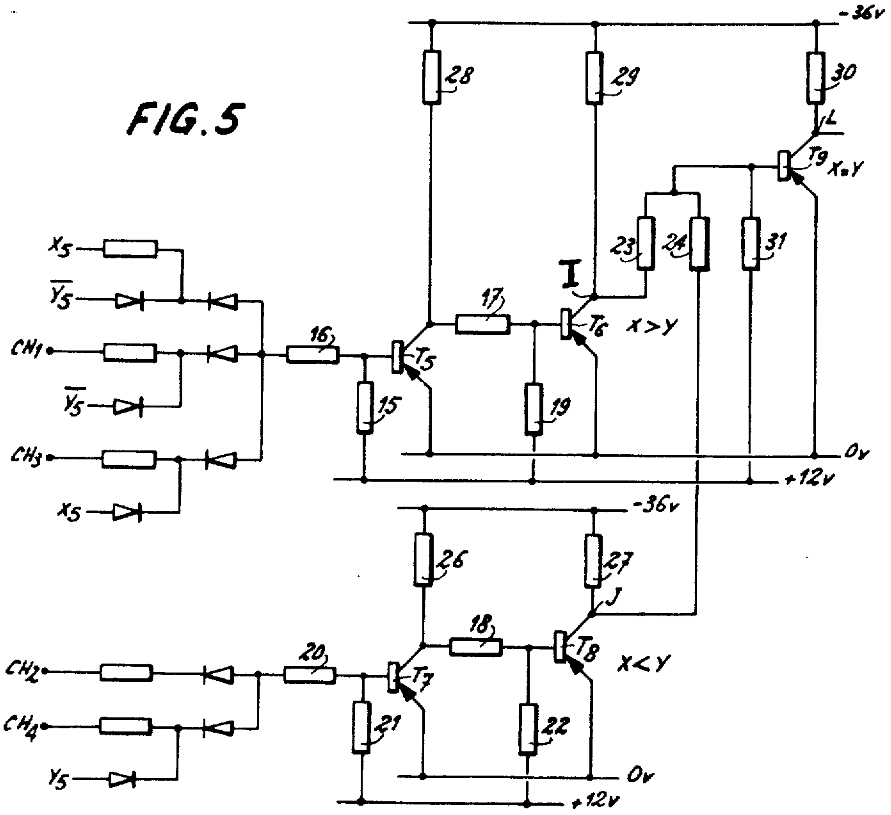

By way of example only, embodiments of the invention will now be described in greater detail with reference to the accompanying drawings of which:

FIG. 1 represents a preferred form of comparator using a first code which is illustrated by FIG. 2, FIG. 3 is a block schematic of a device which is associated with three comparators of the same type as that in FIG. 1 or FIGS. 4 and 5 to carry out a comparison of two decimal numbers with three figures.

Figure 7:
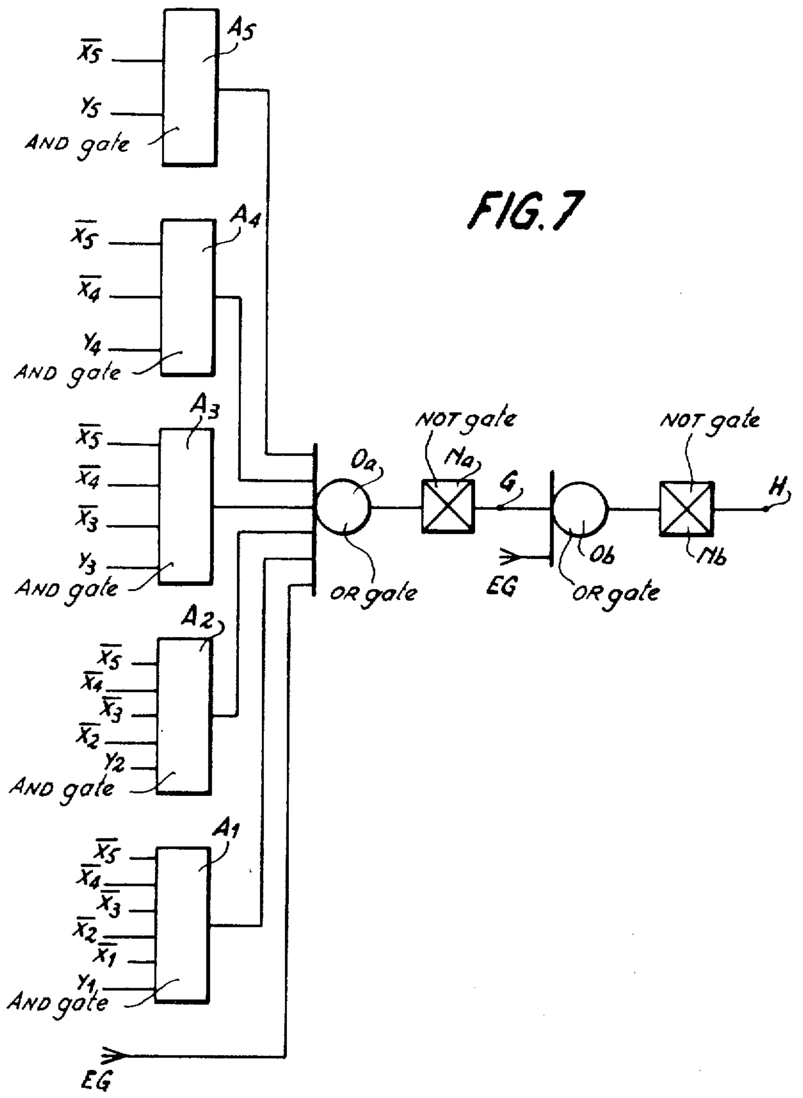

FIGS. 4 and 5, taken together, represent the preferred form of a comparator using a second code which is illustrated by FIG. 6, and, FIG. 7 is a block schematic of the basic structure of a comparator embodying the invention.

FIG. 1 shows a comparator device comprising a chain of diodes and resistors capable of indicating the sense of the inequality of two suitably coded numbers and an assembly of AND gates capable of indicating their equality.

The equality circuits comprise $n$ pairs of AND gates, $n$ being the maximum value of either of the numbers to be compared.

Each AND gate comprises three diodes $dn$, $d'n$ and $d''n$ poled as shown and joined to a common point which is, in turn, connected to a negative voltage via a resistor $rn$, the voltage holding the gate closed.

The base of a transistor $T_1$ is connected via resistor 1 to the common point of the diodes $d''$ forming an or circuit. The base of transistor $T_1$ is linked to a voltage source of +12 volts by means of a resistor 2.

The collector of the transistor $T_1$ is joined to the base of a transistor $T_2$ through a resistor 3. The base of the transistor $T_2$ is connected to a source of voltage of +12 volts via resistor 4. The emitters of the two transistors are connected to earth whilst their collectors are connected to a voltage source of −36 volts by the respective resistors 5 and 6.

In what follows it will be assumed that the two numbers X and Y to be compared are coded according to the code shown in FIG. 2 in which the possible values of, in the chart shown in FIG. 2. X are given in the left-hand vertical column and the coded equivalent is indicated by the combination of binary digits in the corresponding row, the binary positions being indicated by the columns $X_1 \ldots X_5$. Values of Y could be illustrated by a table similar to that of FIG. 2. Thus, the number $X=1$ is represented by a "1" preceded by four "0's." the number 2 by a "0" preceded by a "1" preceded by three "0's," and so on.

It will be apparent that this code is governed by two laws:

First, to represent decimal numbers not exceeding a maximum value of $n$ (which in the non-restrictive example in FIG. 2 is taken as 5), $n$ positions are assigned to the code (in practice, it is clear that $n=9$ will be taken most often and that this will be associated with sets of ten comparators, as will be seen below).

Second, each member is represented by one "1" accompanied by $(n-1)$ "0's" and the position, from one number to the next, of the "1" is shifted by one column to the left or to the right (depending on whether it is the code represented in FIG. 2 which is used or its complement which is obtained by replacing the "0" by "1" and vice versa). The "1" progresses in a way along the diagonal of a square grid.

Numbers X and Y to be compared are each represented physically by $n$ electrical signals $X_1 \ldots X_n$ or $Y_1 \ldots Y_n$, and one of the signals of a number has the value of "1" and corresponds, for example, to a potential of −36 volts, whilst all the others have the value of "0" corresponding for example to a potential of 0 volts. It is submitted that the respective digits of the numbers X and Y generally will be stored in bistable devices, each of which will provide on one output thereof one of the digits for instance $X_n$ and, at the other output thereof, the complement $\overline{X}_n$ of that digit.

A pair of signals of like sign, X and Y, to be compared is applied to each of the AND gates of equality. If X and Y are equal, and only if they are, one of the pairs $X_nY_n$ will give the equality which will be expressed by the presence of a "1" at the output of the corresponding AND gate, and therefore of the OR gate, and therefore by $T_1$ becoming unblocked. The voltage drop across the collector resistor 5 results in the presence of a zero voltage at point E (it is marked that transistor $T_1$ operates as a NOT gate), which blocks transistor $T_2$ and gives rise to a negative voltage (signal "1") at point F (transistor $T_2$ also operates as a NOT gate). The presence of the signal 1 at point F thus signifies that X and Y are equal, the presence of a signal 0 that they are unequal.

The "inequality chain" comprises diodes $D_1 \ldots D_n$ of the anodes of which are applied signals $\overline{X}_1 \ldots \overline{X}_n$ which are complementary to those representing number X. These diodes are connected in series with resistors $R_1 \ldots R_n$ themselves in series with diodes $D_1' \ldots D_n'$ to the cathode of which are applied the signals $Y_1 \ldots Y_n$ representing Y. Let $A_1 \ldots A_n$ be the points common to the diodes $D_1 \ldots D_n$ and the resistors $R_1 \ldots R_n$ respectively of the successive "horizontal" double ladders thus formed.

These points are interconnected by diodes $D''_1 \ldots D''_{n-1}$. The "upper" point $A_n$ is joined to the base of a transistor $T_3$ by a resistor 7. This base is connected to a source of +12 volts by a transistor 8, and to the point F by a resistor 9.

The collector of transistor $T_3$ is joined to the base of a transistor $T_4$ by a resistor 10. The base of transistor $T_4$ is also joined to a source of +12 volts by a resistor 11, and to the point F by a resistor 12.

The emitters of transistors $T_3$ and $T_4$ are connected to earth, whilst their collectors are connected to a source of −36 volts by a resistor 13 and 14 respectively.

To facilitate explanation of the mode of operation of this inequality chain, it is assumed to begin with that the circuit is to respond to the values $X=1$ and $Y=3$, in which case:

$X_1=1$ and $X_2=X_3= \ldots X_n=0$;
whence $\overline{X}_1=0$ and $\overline{X}_2=\overline{X}_n=1$;
$Y_1=Y_2=Y_4= \ldots Y_n=0$ and $Y_3=1$.

It is clear that in this case, apart from the first, all the rungs of the inequality chain ladder to the left must be blocked whilst all the rungs to the right can be transmitting.

In fact, ony the third stage to the right will be transmitting because a negative voltage of an absolute value less than 36 volts will be appied to points $A_n$ for which $n \geqslant 3$. Under these conditions $T_3$ will be unblocked, $T_4$ will therefore be blocked ($T_3$ and $T_4$ each operate as a NOT gate) and the inequality signal signifying $Y>X$ will appear at the point H.

Keeping Y at a vaue of 3, if a value of 3 is also assigned to X, the third rungs on the right and left are both liable to conduct, but a current is established between $\overline{X}_3$ at potential 0 volt and $Y_3$ at a potential −36 volts so that the potential at $A_3$ is 0 volt apart from the voltage drop in the diode $D_3$. As a result the potential at $A_n$ will be slightly positive with the result that, if it were alone, the inequality chain would give the response $X>Y$. But in fact the equality gates send a signal "1" to the bases of the two transistors $T_3$, $T_4$ which therefore both give a signal 0, respectively at H and G.

Keeping Y at a value of 3, if a value greater than 3, for example 5, is assigned to X, a current will be established from the potential +12 volts towards the point $Y_3$ at potential −36 volts in the third rung to the right. As a result $A_3$ is at a negative potential which appears at $A_5$ due to the direction of conduction of the diodes in the central branch. But at the fifth rung to the left, the potential applied directly by the diode $D_5$, without resistance, is 0 volt. There will thus be simultaneously superposition of a current circulating from $\overline{X}_5$ to $Y_3$, the result of which will be to establish a slightly positive potential at $A_5$ (voltage drop due to the internal resistance of $D_5$). If the direction of conduction is favorable, this positive potential will appear at $A_n$ and the transistor $T_3$ is blocked. The signal 1 will then appear at G signifying that $X>Y$.

Finally, it can be seen that the highest rung to which is applied a different voltage than the other rungs (right or left) imposes its potential. As on the left it is a matter of a potential 0, as the signals $\overline{X}$ have been established, whilst on the right it is a question of a potential 1, a positive or negative potential finally appearing at the top point $A_n$, this potential controlling the transistors $T_3$ and $T_4$ which act as an inequality relay. These transistors could obviously be replaced by any other suitable form of device which can operate as an inequality relay, that is to say can transform positive and negative potentials into two signals indicating inequalities of opposite sign.

The method for comparing two three-figure decimal numbers will now be examined with reference to FIG. 3.

To do this all that is required is three comparators of the type shown in FIG. 1 each comprising 10 double rungs corresponding to the digits 0 to 9. One of these comparators supplies one of the three signals $X_c=Y_c$ (equality of the hundred digits of the two numbers X and Y to be compared), $X_c>Y_c$ or $X_c<Y_c$. Another supplies one of the three signals $X_d=Y_d$, $X_d>Y_d$ or $X_d<Y_d$ (tens), and the third supplies one of the signals $X_u=Y_u$, $X_u>Y_u$ or $X_u<Y_u$ (units). The 9 signals referred to above are applied simultaneously to the assembly shown in FIG. 3 which comprises 5 AND gates ($E_1$ to $E_5$) and 2 OR gates ($O_1$ and $O_2$).

Thus, for example, the inequality signal $X>Y$ is obtained when $X_c>Y_c$ or $X_c=Y_c$ and $X_d>Y_d$ or $X_c=Y_c$ and $X_d=Y_d$ and $X_u>Y_u$.

Obviously, the principle of this comparator can be generalised for an arbitrary number with an arbitrary base.

It will now be shown, with reference to FIGS. 4 and 5 which should be considered together, the points denoted by the reference $CH_1$ in the two figures being connected together and similarly the points $CH_2$, $CH_3$ and $CH_4$, that the comparator in accordance with the invention can equally well be made—with a structure of the same type—to compare numbers translated into a progressive binary code represented in FIG. 6 for the first 10 numbers.

This binary code, like that shown in FIG. 2, conforms with the general definition given at the beginning of this text. More precisely, it has the following properties:

- $n$ Successive numbers are respectively represented by $n$ binary numbers with $n/2$ digits forming two successive square grids,
- One of the diagonals of the first grid only contains "0," the said grid only containing "0" to the left of this diagonal; the second grid contains values complementary to the first.

The code in FIG. 6 differs in other ways from that in FIG. 2 in that:

- Each grid only contains "0" to one side of the said diagonal, and "1" to the other side,
- The code is "closed," necessarily containing an even number of coded numbers,
- A number is not always represented by the same binary number in this code. For example, if the code represents 10 numbers, 10 is represented by 1000 whereas it is represented by 0111 111 111 if the code represents 20 numbers.

Each of the chains $CH_1$ to $CH_4$ shown in FIG. 4 has a structure identical to the "inequality chain" in FIG. 1, that is it comprises, in the example described, five pairs of opposing teeth with a central branch linking them, forming a double comb. The teeth to the left each comprise a diode capable of transmitting the signal 0 (0 volt) and blocking the signal 1 (−36 volts).

The teeth to the right each comprise a resistor in series with a diode capable of blocking the signal 0 and transmitting the signal 1.

The central branch comprises a diode for each pair of teeth, capable of transmitting a potential greater than the level 0 (+12 volts for example) to the end marked CH by means of impedance components which will be specified below.

To simplify the explanation, each "tooth" is referred to by the notation for the signal which is applied to it, this notation being marked in the drawing. It will be seen that the pairs of teeth of the same level in chains $CH_1$ and $CH_4$, on the one hand, and $CH_2$ and $CH_3$, on the other hand, are connected in parallel, but that, whilst the diodes of $CH_1$ transmit from level 1 to level 5, the diodes of $CH_4$ transmit from level 5 to level 1. Similarly the diodes of $CH_3$ transmit from level 1 to level 5, whilst the diodes of $CH_2$ transmit from level 5 to level 1. The order of the levels is that indicated in FIG. 4 by the ascending values used to designate the signals.

FIG. 5 shows that a potential of +12 volts is applied to the point $CH_1$ through resistors 15 and 16, from a diode which is part of an OR circuit with three inputs and an AND gate with two inputs, one of which is $CH_1$ and to the other of which is applied signal $\overline{Y}_5$.

This AND gate forms one of the three branches of the OR gate, the other two branches of which are:

- An AND gate to the inputs of which are applied $X_5$ and $\overline{Y}_5$
- An AND gate to one input of which is applied $X_5$, the other input being connected to the point $CH_3$.

The point common to resistors 15 and 16 is joined to the base of a transistor $T_5$, the emitter of which is connected to a potential 0 volt, and the collector of which is connected to −36 volts via a resistor 28 and to the base of a transistor $T_6$ via a resistor 17.

The base of the transistor $T_6$ receives +12 volts through a resistor 19, its emitter being at a potential 0 volt and its collector connected to −36 volts via a resistor 29.

A second OR gate has two branches made up in the following way:

- An AND gate with one input connected to the point $CH_4$ and $Y_5$ applied to the other input,
- A diode, in series with a resistor, to which is connected the point $CH_2$.

A resistor 20 links the output from the OR gate to the base of a transistor $T_7$. The said base receives +12 volts through a resistor 21. The collector of the transistor $T_7$ is connected to the base of a transistor $T_8$ by a resistor 18.

The base of the transistor $T_8$ receives +12 volts through a resistor 22.

The emitters of the transistors $T_7$ and $T_8$ receive 0 volt. The collectors of the transistors are respectively connected to −36 volts via respective resistors 26 and 27.

Point I joined to the collector of transistor $T_6$ and the point J connected to the collector of transistor $T_8$ are respectively joined by resistors 23 and 24 to the base of a transistor $T_9$. The said base is also connected to +12 volts by a resistor 31, whilst the emitter of the transistor $T_9$ is connected to 0 volt and its collector to −36 volts through a resistor 30.

The method of operation of the comparator shown in FIGS. 4 and 5 will now be described for the values $X=3$ and $Y=1$.

In this case it can be shown, reasoning as in the case of the comparator shown in FIG. 1, that the chain $CH_1$ applies a negative signal to the point $CH_1$.

The mode of operation of the chain $CH_1$ can then be analysed as follows:

Considering the successive rungs formed by a pair of "teeth" of the double comb making the chain, starting from the point $CH_1$, the first rung receives two signals 1 and, operating as an AND gate, gives a negative signal at its output $CH_1$.

None of the higher rungs impedes the operation of this AND gate. A signal 0 on a tooth to the left cannot, in fact, be transmitted by the corresponding diode of the central branch of the chain, the anode of which is subjected to a negative potential.

It is easy to show that the chain $CH_1$ behaves like this in every case and that it furnishes a negative signal if there is coincidence of signals 1 on at least one of its rungs, provided no signal 0 exists on a tooth to the left at a lower level to this rung. This condition can be expressed by saying that the effect of coincidence is annulled by the presence of a signal 0 on a tooth to the left of the chain positioned "downstream" from the AND gate where the coincidence occurs.

Examination of all the possible comparisons shows that, apart from the exceptions which will be discussed later, with the chains shown in FIG. 4 a negative signal is always obtained on a single one of the chains if X and Y are unequal. If $X>Y$, it is the chain $CH_1$ or $CH_3$ which supplies a negative signal depending on whether X is between 1 and 5 or 5 and 10. If $X<Y$, it is the chain $CH_2$ or the chain $CH_4$ which gives a negative signal depending on whether X is between 1 and 5 or 6 and 10. As a result a negative signal appears at point I or point J depending on whether $X>Y$ or $Y>X$.

In fact, a more detailed examination demonstrates that this statement is valid apart from certain exceptions. These exceptions are as follows:

(1) When the information $X_n$ or $\overline{X}_n$ (applied from the single diode side or "left" side) is equal to 1, that is for $$\overline{X}=1 \text{ and } X=\frac{n}{2}+1$$

($n$ being the number of numbers of the code).

(2) In certain cases when a comparison is made between two numbers belonging to different grids of the code.

(3) When the information $Y_n$ (applied from the right side) is equal to 0, that is, for $Y=1$, the number X being taken in the other half of the code ($X>n/2$).

To eliminate errors resulting from the first two cases, at the outputs of the chains $CH_1$, $CH_3$ and $CH_4$, the following signals which are equal to 1 or 0 for the whole of each grid of the code are associated.

$CH_1$ and $\overline{Y}_5$
$CH_3$ and $X_5$
$CH_4$ and $Y_5$ (FIG. 5).

To rectify operation in the third case, when the chains $CH_1$ and $CH_3$ do not furnish any significant information, that is when $X>Y$, an AND circuit has been added at the input to the OR circuit controlling the element indicating this result. This AND circuit with two inputs receives $$X\frac{n}{2} \text{ and } \overline{Y}\frac{n}{2}$$

In the case of the code in FIG. 6, $X_5$ is associated with $Y_5$ (FIG. 5).

It is easy to show that the AND gates provided in this as in FIG. 5 eliminate any errors which might occur in the exceptional cases discussed above.

Finally, the unknown code signals X and Y having been applied to the chains and to the gates of the comparator, one of the chains normally furnishes a signal which is transmitted to the output of the corresponding OR gate, that is one of the resistors 16 or 20.

In the third exception envisaged above, the chains do not give any significant signal but it is the gate ($X_5-Y_5$) which supplies a signal.

As a result, in all cases of inequality, one of the transistors $T_6$ and $T_8$ supplies a signal indicating the sign of the inequality.

If the numbers X and Y are equal, the transistors $T_6$ and $T_8$ transmit two signals 0 to the transistor $T_9$, which results in the generating of a signal 1 indicating equality at the point L. (The transistors $T_5$ to $T_9$ each operate as NOT gates.)

It will now be shown, by referring to FIG. 7, that the base structure of a double comb common to the devices in FIGS. 1 and 4, conforms with the plan of a more general logic circuit capable of carrying out the same function. The different elements (AND, OR and NOT gates) of this logic circuit could be made up of diodes and resistors arranged in the classical manner, without going beyond the scope of the present invention, but the structure with a double comb is always the preferred, and particularly simple, embodiment.

The logic circuit in FIG. 7 relates to a comparator suitable for using the code in FIG. 2, with $n=5$.

It comprises AND gates denoted by $A_1$ to $A_5$ whose outputs are parallel-connected to an OR gate denoted by $O_a$.

In series with this are connected a NOR gate denoted by $N_a$, an OR gate denoted by $O_b$ and a NOR gate denoted by $N_b$.

It can be seen that the AND gates corresponding to successive levels 1 and 5 receive, on the one hand, the respective signals $Y_1$ to $Y_5$; on the other hand, each AND gate receiving the signal $Y_p$ ($p$ being an integer which takes successive values 1 to 5), also receives the signals $\overline{X}_p, \overline{X}_{p+1} \ldots \overline{X}_n$.

It is easy to see that such a structure, associated with the gate $O_a$, from the point of view of its mode of functioning, is equivalent to the double comb structure in FIG. 1 since one of its rungs $p$, therefore, finally, the structure itself, furnishes a signal 1 when $\overline{X}_p=\overline{X}_p=1$ provided none of the signals $\overline{X}$ of a level higher than $p$ in zero.

In other words, a signal 1 is not supplied due to the signals $\overline{X}$ and Y being equal at a certain level unless its effect is not annulled by the presence of a signal $\overline{X}$ of value 0 downstream from this level.

The mode of operation of the inequality chain of the comparator in FIG. 1 can be expressed in this way.

To complete the comparator in accordance with FIG. 1, an input EG must be added to the gate $O_a$ so that the latter supplies a signal 1 when X and Y are equal.

The gate $N_a$ acts as inverter of NOT gate, that is it delivers a signal 0 to the point G when $O_a$ supplies a signal 1, that is when $X<Y$. The NOT gate $N_b$ then gives a signal 1.

When $X>Y$, the gate $N_a$ gives a signal 1 whereas the gate $N_b$ gives a signal 0. When $X=Y$, the gate $N_a$ gives a signal 0; but the equality signal EG is applied to the input to the gate $O_b$, so the gate $N_b$ nevertheless gives a signal 0.

The circuit in FIG. 7 should, of course, be completed by a circuit capable of furnishing the signal for equality: such a circuit is shown in FIG. 1 and as it is very simple, it is not necessary to give the general logic circuit.

The general logic circuit of the comparator in FIG. 4 will not be given either. It is sufficient to indicate that it will comprise a group of five AND gates associated with an OR circuit for each of its four chains, these receiving the same inputs as the group of AND gates in FIG. 7. It will be completed, in addition, by AND, OR and NOT gates in a manner which will be clear to the skilled man on examining the diagram in FIG. 5.

The embodiments described and represented are not, of course, restrictive. It would be possible, in particular, to envisage using a more symmetrical code than that in FIG. 6 in order to reduce the number of cases where the four chains of the comparator give false information. To do this it would be sufficient to modify the code in FIG. 6 by suppressing the numbers which are only represented by 0 or 1 (that is, in the case of FIG. 6, the numbers 1 and 6).

With the modified code only the chains $CH_1$ and $CH_4$ will, in certain cases, give false information and necessitate being associated, in the AND gates, respectively with $\overline{Y}_{n/2}$ and $Y_{n/2}$.

What I claim is:

1. A comparator device for indicating which is the greater of two numbers X and Y coded in a binary code with $n$ successive binary positions in which one of the binary digits "0" and "1" is shifted from one binary position from one number to the next, in such manner that the $n$ binary digits form at least one square grid having a diagonal containing only one of the binary digits "0" or "1," each grid containing only the other one of the digits "0" or "1" at least to one side of this diagonal, the number Y being provided under the form of $n$ binary electrical signals $Y_1, Y_2 \ldots Y_n$ whereas the complement $\overline{X}$ of the number X is provided under the form of binary electric signals $\overline{X}_1, \overline{X}_2 \ldots \overline{X}_n$, said binary signals having first and second levels of potential, said comparator device comprising at least one group including an OR gate and first, second . . . $n$th AND gates each having one output, the first AND gate having $$(n+1)$$

inputs, the second AND gate having $n$ inputs, the third AND gate having $(n-1)$ inputs . . . and the $n$th AND gate having two inputs; said OR gate having $n$ inputs which are respectively connected to the outputs of the respective AND gates; and means for applying, to the $(n+1)$ inputs of the first AND gate, the binary signals $Y_1, \overline{X}_1 \ldots \overline{X}_n$, to the respective $n$ inputs of the second AND gate, the binary signals $Y_2, \overline{X}_2 \ldots \overline{X}_n$, to the respective $(n-1)$ inputs of the third AND gate, the binary signals $Y_3, \overline{X}_3, \overline{X}_4 \ldots \overline{X}_n$ and to the two respective inputs of the $n$th AND gate, the binary signals $Y_n\overline{X}_n$.

2. A comparator device as claimed in claim 1, said device further comprising, for each of said groups, first and second NOT gates and a further OR gate, the said OR gate having an output and a further input and the said further OR gate having first and second inputs and an output, said NOT gates each having an input and an output, the input of the first NOT gate being connected to the output of the OR gate and the output of the first NOT gate being connected to the first input of the further OR gate, the input of the second NOT gate being connected to the output of the further OR gate; and means for providing a binary signal to the further input of the OR gate and to the second input of the further OR gate each time X is equal to Y.

3. A comparator device as claimed in claim 2, wherein said means for providing a binary signal each time X is equal to Y include first, second . . . $n$th AND gates each having two inputs and an output, and an OR gate having $n$ inputs which are respectively connected to the outputs of the $n$ AND gates, and means for applying the binary signals $X_1$ and $Y_1$, $X_2$ and $Y_2$ . . . $X_n$ and $Y_n$ to the inputs of the first, second . . . $n$th AND gates respectively.

4. A comparator device for indicating which is the greater of two numbers X and Y coded in a binary code with $n$ successive binary positions in which one of the binary digits "0" and "1" is shifted from one binary position from one number to the next, in such manner that the $n$ binary digits form at least one square grid having a diagonal containing only one of the binary digits "0" or "1," each grid containing only the other one of the digits "0" or "1" at least to one side of this diagonal, the number Y being provided under the form of $n$ binary electrical signals $Y_1, Y_2 \ldots Y_n$ whereas the complement $\overline{X}$ of the number X is provided under the form of binary electric signals $\overline{X}_1, \overline{X}_2 \ldots \overline{X}_n$, said binary signals having first and second levels of potential, said comparator device comprising at least one double comb structure with $n$ pairs of teeth and a central branch, each pair including first and second teeth, each having a free end and arranged on either side of said central branch and connected together at a junction point on said central branch; means for applying the binary signals $\overline{X}_1, \overline{X}_2 \ldots \overline{X}_n$ to the free ends of the respective first teeth of the $n$ pairs and for applying the binary signals $Y_1, Y_2 \ldots Y_n$ to the free ends of the respective second teeth of the $n$ pairs, each of the first teeth comprising a unidirectional conduction device adapted for transmitting those of the said binary signals of the said first level of potential and blocking those of the said signals of the said second level, said second level being lower than the first level, each of the second teeth comprising a resistor and a further unidirectional conducting device, said resistor connecting said junction point to the free end of said second teeth, the further unidirectional conductive devices being poled in the same direction as the unidirectional devices of the first teeth, said central branch including unidirectional devices connecting said junction points together; resistor means having a free end, an intermediate point and a further end, said further end being connected to that one of the unidirectional devices of said central branches which is connected to the junction points between the teeth to the free ends of which the binary signals $\overline{X}_n$ and $Y_n$ are applied; a source of potential higher than the first level being connected to the free end of said resistor means, said unidirectional devices of the central branch being adapted for transmitting the said potential to the said teeth, and an indicating device connected to said intermediate point and adapted for generating two distinct signals depending on the value of the potential of the said intermediate point.

5. A comparator device for indicating the relative values of two numbers X and Y provided under the form of $n$ binary electrical signals $X_1, X_2 \ldots X_n$ and $Y_1, Y_2 \ldots Y_n$ and of the complementary binary electrical signals $\overline{X}_1, \overline{X}_2 \ldots \overline{X}_n$ and $\overline{Y}_1, \overline{Y}_2 \ldots \overline{Y}_n$, said binary signals having 0 and 1 levels of potentials, the digits $X_1, X_2 \ldots X_n$ which represent the successive decimal numbers between 1 and $n$ forming a square grid having binary digits 1 along one diagonal thereof and binary digits 0 on either side of said diagonal, said comparator device comprising first, second . . . $n$th AND gates each having two inputs and an output; a first OR gate having an output and $n$ inputs which are respectively connected to the outputs of the $n$ AND gates; means for applying the binary signals $X_1$ and $Y_1$, $X_2$ and $Y_2$ . . . $X_n$ and $Y_n$ to the inputs of the first, second . . . $n$th AND gates respectively; first, second, third and fourth NOT gates each having an input and an output; a second OR gate having first and second inputs and an output; means connecting the output of the first OR gate to the input of the first NOT gate; means connecting the output of the first NOT gate to the input of the second NOT gate; a comb structure with first, second . . . $n$th left hand teeth, first, second . . . $n$th right hand teeth and a central branch, the pair of first teeth being connected together at a first junction point on the central branch, the pair of second teeth being connected together at a second junction point on the central branch . . . , the pair of $n$th teeth being connected together at a $n$th junction point on the central branch, each of the said teeth having a free end opposite said junction point, the left hand teeth each including a diode, the right hand teeth each including a resistor and a diode serially connected between the junction point and the free end; resistor means having first and second free ends and an intermediate point, said second free end being connected to said $n$th junction point and said intermediate point being connected to the input of the third NOT gate; the said central branch consisting of $(n-1)$ diodes respectively connecting the $n$ junction points together; means for applying the binary signals $\overline{X}_1, \overline{X}_2 \ldots \overline{X}_n$ on the respective free ends of the left hand teeth and for applying the binary signals $Y_1, Y_2 \ldots Y_n$ on the respective free ends of the right hand teeth; a source of a potential higher than the said 0 and 1 levels being connected to the free end of said resistor means; means for connecting the output of said second NOT gate to said intermediate point and to the second input of the second OR gate; means for connecting the output of the third NOT gate to the first input of the second OR gate and means for connecting the output of the second OR gate to the input of the fourth NOT gate.

References Cited

UNITED STATES PATENTS 3,091,392 5/1963 Arya ------------- 340—146.2

MALCOM A. MORRISON, Primary Examiner

R. S. DILDINE, Jr., Assistant Examiner